United States Patent [19]

Obu

[11] Patent Number: 4,589,730

[45] Date of Patent: May 20, 1986

[54] LIGHT TRANSMISSION CONTROL APPARATUS USING AIR BUBBLES

[75] Inventor: Makoto Obu, Tokyo, Japan

[73] Assignee: Ricoh Company, Ltd., Tokyo, Japan

[21] Appl. No.: 517,651

[22] Filed: Jul. 27, 1983

[30] Foreign Application Priority Data

Jul. 28, 1982 [JP] Japan ................................ 57-130411
Sep. 3, 1982 [JP] Japan ................................ 57-152530

[51] Int. Cl.⁴ ........................ G02B 5/24; G05D 25/04
[52] U.S. Cl. .................................... 350/267; 350/315; 350/355; 40/406
[58] Field of Search ............... 350/266, 267, 312, 315, 350/318, 355, 359; 40/406, 407

[56] References Cited

U.S. PATENT DOCUMENTS

| | | | |
|---|---|---|---|
| 2,701,929 | 2/1955 | Lemelson | 40/406 |
| 4,261,331 | 4/1981 | Stephens | 350/267 |
| 4,337,998 | 6/1982 | Basiulis | 350/267 |

FOREIGN PATENT DOCUMENTS

| | | | |
|---|---|---|---|
| 2548846 | 5/1976 | Fed. Rep. of Germany | 350/359 |
| 0679907 | 8/1979 | U.S.S.R. | 350/312 |

*Primary Examiner*—Bruce Y. Arnold
*Assistant Examiner*—William Propp
*Attorney, Agent, or Firm*—Oblon, Fisher, Spivak, McClelland & Maier

[57] ABSTRACT

A light transmission control apparatus of the present invention relies on the principle of light transmission when an air bubble is produced in opaque liquid. In one form of the present invention, an optical switching device includes a container for containing therein opaque liquid, which is provided with transparent inlet and outlet sections. Transmission of light from the inlet section to the outlet section through the container is controlled by production or disappearance of air bubbles in the opaque liquid present between the inlet and outlet sections. In another form of the present invention, a display device includes a container for containing therein opaque liquid, which is provided with a transparent section defining an observation window or screen. A plurality of picture elements are provided in the form of an array, either one or two dimensional, as normally hidden by the opaque liquid. Air bubbles are produced in the opaque liquid to expose selected picture elements which define a reproduced image.

20 Claims, 9 Drawing Figures

LIGHT TRANSMISSION CONTROL APPARATUS USING AIR BUBBLES

BACKGROUND OF THE INVENTION

1. Field of the Invention

This invention generally relates to apparatus for controlling light transmission by bubbles, and in particular, to a bubble-controlled light transmission apparatus in which transmission of light is controlled by production and disappearance of air bubbles in opaque liquid. Such a bubble-controlled light transmission apparatus may be applied as a light switching device for converting electrical signals into light signals and a display device.

2. Description of the Prior Art

Various types of light transmission control apparatus are used. One typical application of light transmission control apparatus is an optical writing device for optically writing image information on the surface of a photosensitive member in a non-impact type printer. Upon writing, the photosensitive member is subjected to any well-known electrophotographic process to obtain a visual image. Such an optical writing device is usually comprised of a liquid crystal rod or photomagnetic effect element as a means for converting electrical signals into optical signals which are to be used in writing information on a recording medium such as a photosensitive member. However, in such prior art optical write-in devices, the response speed is relatively slow, e.g., approximately 0.5 msec. for the liquid crystal case and 0.015 msec. for the photomagnetic effect element case. Moreover, such prior art devices are complicated in structure and thus difficult to manufacture, thereby increasing manufacturing cost. Therefore, there has been a need to develop a new optical switching device faster in response time and simpler in structure.

SUMMARY OF THE INVENTION

In accordance with one form of the present invention, there is provided a novel optical switching device capable of carrying out conversion between electrical and light signals at an increased speed without requiring a complicated structure. Briefly stated, the optical switching device includes a container having therein a quantity of liquid which is substantially non-transparent to light. The container includes an optical inlet section through which light may be inputted and an optical outlet section through which light is transmitted. A heater is immersed in the opaque liquid and a pair of electrodes are connected to the heater. A control circuit, connected to the pair of electrodes, controls the activation of the heater in response to electrical signals supplied thereto. When the heater is activated, an air bubble is formed thereby allowing the transmission of light from the inlet to the outlet through the thus formed air bubble.

In accordance with another form of the present invention, there is provided a display device using the present bubble-controlled light transmission principle. In this display device, air bubbles are selectively formed to expose picture elements thereby defining a desired image pattern. Such a display device is particularly useful as a color display device because each picture element may have desired color.

Therefore, it is a primary object of the present invention to provide an improved apparatus for controlling transmission of light using air bubbles.

Another object of the present invention is to provide an optical switching device having an increased speed of conversion between electrical and light signals.

A further object of the present invention is to provide a high-speed optical switching device which is simple in structure and thus easy to manufacture.

A still further object of the present invention is to provide an improved optical switching device suitable to be used as a write-in device in the non-impact type printer.

A still further object of the present invention is to provide an improved display device employing the present bubble-controlled light transmission principle.

A still further object of the present invention is to provide a novel color display device.

Other objects, advantages and novel features of the present invention will become apparent from the following detailed description of the invention when considered in conjunction with the accompanying drawings.

DESCRIPTION OF THE PREFERRED EMBODIMENTS

Figure 1:
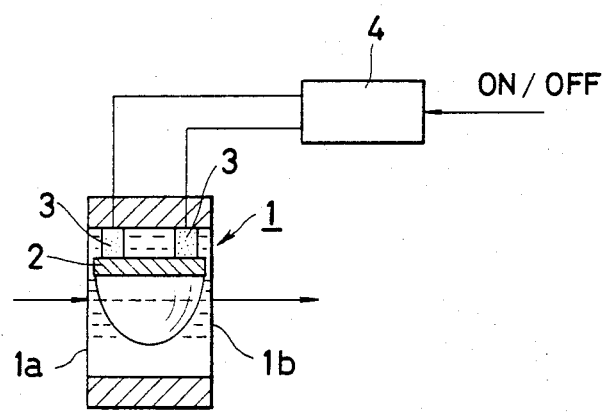
FIG. 1 is a schematic illustration showing an optical switching device constructed in accordance with one embodiment of the present invention.

Referring now to FIG. 1, there is shown one embodiment of the present optical switching device which includes a container 1 for containing therein a quantity of optically non-transparent liquid which substantially does not allow transmission of light therethrough, e.g., water mixed with ink or the like. The container 1 includes a pair of opposite side surfaces which are comprised of light-transmitting material, and, thus, one of the side surfaces constitutes a light inlet surface 1a l with the other defining a light outlet surface 1b. It is to be noted, however, that these inlet and outlet surfaces 1a and 1b do not always need to be disposed opposite to each other, but they may be disposed in various forms depending upon refraction of light passing through the liquid in the container 1. Inside the container 1 and in the vicinity of the top inner surface of the container 1 is disposed a heater 2 immersed in the liquid. The heater 2 is supported by a pair of split electrodes 3, 3 each fixed to the top inner surface of the container 1. These split electrodes 3, 3 are electrically connected to a control circuit 4 which is provided on the exterior of the container 1 and which receives an on/off signal to activate and deactivate the heater 2.

In operation, in response to an on/off signal supplied, the control circuit 4 controls flow of current through the heater 2 via the electrodes 3, 3. That is, when an on-signal is supplied, the control circuit 4 causes current of predetermined level to flow through the heater 2 via the electrodes 3, 3, and the current flow is terminated when an off-signal is received by the control circuit 4. When current is caused to flow through the heater 2 in this manner, the heater 2 produces heat due to Joule heating, which is then applied to the liquid surrounding the heater 2 thereby increasing its temperature. As a result, the liquid temperature is locally increased and saturation vapor pressure is decreased so that an air bubble is produced at the surface of the heater 2. In the preferred embodiment shown in FIG. 1, the heater 2 is so structured that the bottom surface may be heated to primarily produce an air bubble adjacent to the bottom surface of the heater 2. On the other hand, when an off-signal is supplied, no current flows through the heater 2 so that no air bubble is produced.

As indicated by an arrow, light is continuously directed into the container 1 through the inlet surface 1a. However, as long as the control signal 4 receives an off-signal, the heater 2 is maintained deactivated so that no air bubble is produced adjacent to the bottom surface of the heater 2 or the light path between the inlet and outlet surfaces 1a and 1b. Thus, the incident light becomes substantially absorbed by the opaque liquid and no appreciable light is emitted out of the outlet surface 1b. On the other hand, when an on-signal is supplied, the heater 2 is activated by the control circuit 4 to produce an air bubble thereby allowing the incident light to reach the outlet surface 1b through the thus produced air bubble without incurring a substantial decrease in intensity. In this manner, electrical on/off signals supplied to the control circuit 4 may be easily converted to optical on/off signals at the side of the outlet surface 1b.

In this case, in order to carry out conversion between electrical and optical on/off signals as accurately as possible, the response time determined by the time required for production and disappearance of air bubble must be sufficiently short. In this respect, it has been confirmed experimentally by the present inventor that the response time of the present bubble-controlled electrical-to-light signal conversion device is shorter than those of prior art photomagnetic effect elements and liquid crystal rods significantly. For example, in the case when current of 150 mA is caused to flow through the heater at voltage of 25 volts, the time required from production to disappearance of air bubble is in the order of 10 microseconds. It is to be noted that the present embodiment is so structured that an air bubble is to be produced and annihilated in the opaque ink-containing liquid; however, various other combinations of liquid and gas are also possible without departing from the spirit of the present invention.

Figure 2:
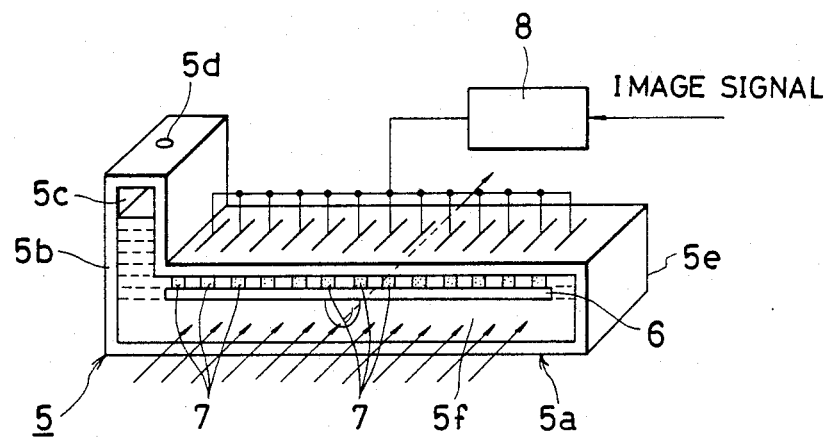
FIG. 2 is a schematic illustration showing an optical switching device having an array of optical switch elements constructed in accordance with another embodiment of the present invention.

FIG. 2 shows another embodiment of the present invention, in which a plurality of optical switching elements, each having the structure illustrated in FIG. 1, are provided in the form of a single array. The optical switching device of FIG. 2 includes a generally L-shaped container 5 in which the opaque liquid which does not allow transmission of light and comprised, for example, of ink and water is poured such that the opaque liquid completely fills a horizontal section 5a of the L-shaped container 5. The container 5 includes a vertical section 5b which extends vertically upward at one end of the horizontal section 5a, and the opaque liquid only partially fills the vertical section 5b thereby defining void space 5c at top. A through-hole 5d is formed in the top wall of the vertical section 5b so that the void space 5c is in fluid communication with the atmosphere. Provision of such void space 5c is preferred because it can absorb an apparent increase in volume of the opaque liquid when air bubbles are produced in the opaque liquid in the horizontal section 5a and thus vapor pressure may be appropriately adjusted so as to allow production of air bubbles with ease. In other words, when air bubbles are produced to apparently increase the volume of the opaque liquid, the liquid will be displaced into the vertical section 5b by such an increased volume amount because the air in the void space 5c will be easily pushed out into the atmosphere through the hole 5d. Accordingly, the gas pressure inside the void space 5c remains at constant, typically at atmospheric pressure, and thus operational characteristics remain unchanged irrespective of the number of air bubbles produced. It is to be noted that the embodiment shown in FIG. 2 has a front surface 5f which defines a light inlet surface and a rear surface 5e which is opposite to the front surface 5d and defines a light outlet surface. Both of the front and rear surfaces 5d and 5e are comprised of a light-transmitting material.

Furthermore, in the horizontal section 5a of container 5 is disposed a heater 6 extending in parallel with and in the vicinity of the top wall of the horizontal section 5a. A plurality of electrodes 7 are fixedly mounted on the top surface of the heater 6 at a predetermined pitch as arranged in the longitudinal direction of the heater 6. The electrodes 7 are fixed to the top inner wall of the horizontal section 5a to support the heater 6 in position as immersed in the opaque liquid. These electrodes 7 are individually connected to a control circuit 8 provided on the exterior of the container 5. In FIG. 2, such a connection is shown by a single line for the sake of simplicity. An image signal, typically comprised of a train of pulses, is supplied to the control circuit 8 to selectively activate the optical switching elements, each defined between the two adjacent electrodes 7.

In such an optical switching array, an image signal may be supplied to selectively activate the optical switching elements to obtain light image information, as will be described more fully later. That is, when an image signal is supplied, the control circuit 8 selectively activates the optical switching elements, or current is passed through selected regions of the heater 6 via the associated pairs of electrodes 7. Thus, that portion of the heater 6 which extends between the selected pair of electrodes 7 becomes heated locally, thereby producing an air bubble adjacent to the heated portion of the heater 6. On the other hand, as indicated by the arrows, light is uniformly directed into the light inlet surface 5d which is defined below and in the vicinity of the heater 6. Accordingly, when an air bubble is produced as described above, the light passes through such an air bubble and thus the light passing through the air bubble appears at the light outlet surface 5e with retaining substantial intensity. In other words, in accordance with this embodiment of the present invention, a horizontal line sector may be scanned and therefore it may be applied as an optical write-in device for use in a non-impact type printer and the like. With such a structure, there is no need to provide such precision optical components as a polygonal mirror and a hologram disc scanner, so that cost may be significantly reduced and the manufacturing operation may be greatly simplified.

Figure 3:
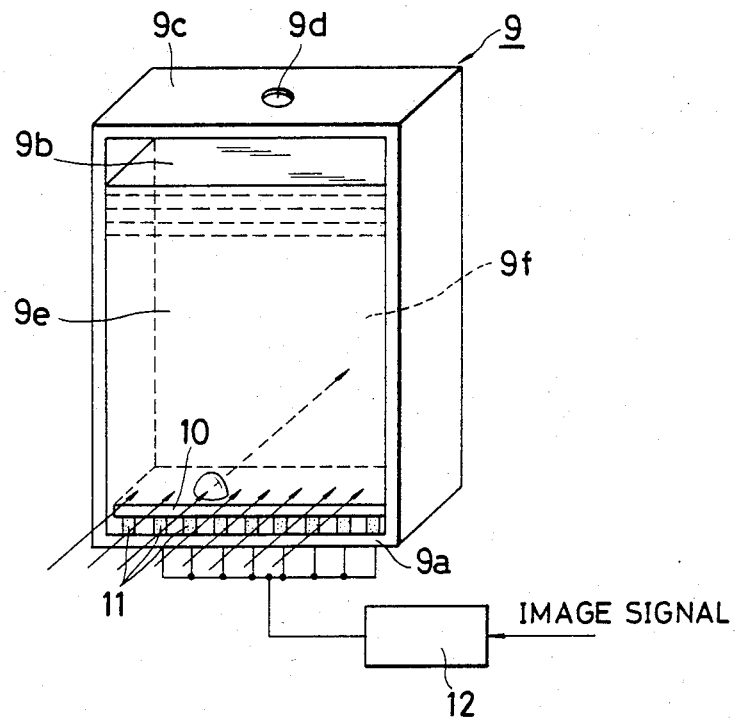
FIG. 3 is a schematic illustration showing an optical switching device having an array of optical switch elements constructed in accordance with a further embodiment of the present invention.

FIG. 3 shows a further embodiment of the optical switching array constructed in accordance with the present invention. As shown in perspective, this embodiment includes a vertically elongated container 9 which allows to contain therein an increased quantity of opaque liquid. At the bottom of the container 9 is disposed a heater 10 which extends generally in parallel with and in the vicinity of the bottom surface of the container 9. Similarly with the previous embodiment, a plurality of electrodes 11 are attached to the heater 10 thereby defining a plurality of optical switching elements which are arranged side-by-side along a side of the container 9, each optical switching element defined between the two adjacent electrodes 11. The container 9 is generally rectangular in shape and its top wall 9c is provided with a through-hole 9d through which the interior of the container 9 is in fluid communication with the atmosphere. Optically non-transparent liquid such as ink containing water is contained in the container 9 such that void space 9b is formed at top. The container 9 also includes a light inlet surface 9e into which uniform light is directed from a light source (not shown) and a light outlet surface 9f which is opposite to the inlet surface 9e and allows the transmitted light to be discharged out of the container 9. Thus, the inlet and outlet surfaces 9e and 9f are both comprised of a light-transmitting material. The electrodes 11 are individually connected to a control circuit 12 which controls activation of individual electrodes 11 in accordance with an image signal received.

The operation of the above-described optical switching array of FIG. 3 is similar to that of the previous embodiment; however, in the present embodiment, since the container 9 is vertically elongated in shape, the depth of the opaque liquid stored in the container 9 is rather large so that convection may take place in the liquid thereby allowing to prevent the occurrence of local increase in temperature. That is, heat may be carried away rapidly from the heater 10 so that the heater 10 may be cooled due to convection and maintained at constant temperature when deactivated. Accordingly, the response speed may be maintained at a high level stably.

Figure 4:
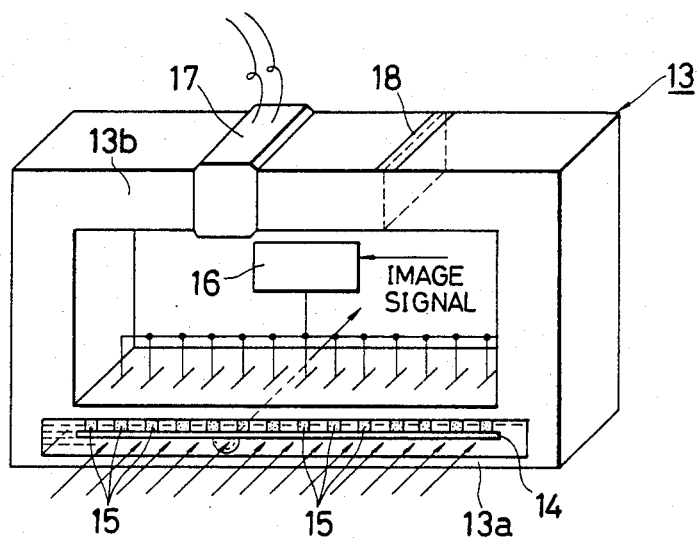
FIG. 4 is a schematic illustration showing an optical switching device having an array of optical switch elements constructed in accordance with a still further embodiment of the present invention.

FIG. 4 shows a still further embodiment of the present invention wherein it is so structured that the opaque liquid is in forced circulation. As shown, this embodiment includes a container 13 which is in the form of a closed loop through which opaque liquid is forcibly circulated. The container 13 has a lower liquid passage 13a which has virtually the same structure as that of the previous embodiment. That is, the lower liquid passage 13a includes a heater 14 in the shape of a plate and a plurality of electrodes affixed to the heater 14 as arranged in a line at a predetermined pitch thereby defining optical switching elements between the two adjacent electrodes. Also provided is a control circuit 16 which is connected to individual electrodes 15 and which activates the optical switching elements selectively in response to an image signal supplied thereto.

The container 13 also includes an upper liquid passage 13b which, in turn, includes a forced circulation device 17 and a filter 18 spaced apart from each other.

The forced circulation device 17, for example, includes a screw and a motor for setting the screw in rotation. Thus, when the screw is set in rotation, the liquid filled in the container 13 is stirred and caused to flow through the closed loop container 13, so that the heater 14 may be efficiently maintained at constant temperature. The provision of the filter 18 allows to collect undesired foreign matter such as debris floating in the circulating liquid. Preferably, it is so structured that the filter 18 is replaceable.

Moreover, in any of the various embodiments described above, a light collecting element such as a micro-lens may be provided on the side of the light outlet surface, and, when so structured, the output light may be focused on a predetermined surface. This is advantageous when accurate light switching operation is desired.

Figure 5:
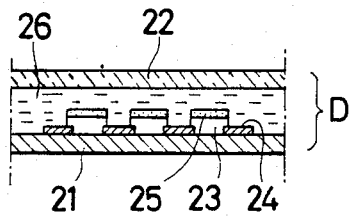
FIG. 5 is a schematic illustration showing a display device embodying the present invention.

Another aspect of the present invention when applied to a display device will be described in detail. FIG. 5 shows the principle structure of a display device to which the present invention is applied. As shown, the display device of FIG. 5 includes a display section D, which, in turn, includes a pair of substrates 21 and 22 disposed in parallel and spaced apart from each other. A plurality of heater elements 23 and electrodes 24 are arranged alternately on the substrate 21 at a predetermined pitch. On top of each heater element is provided a picture element 25 which is preferably colored. The space defined between the pair of substrates 21 and 22 is filled with opaque liquid 26, which comprises, for example, water containing therein pigment or dye or a solvent containing therein fine metal particles.

Figure 6:
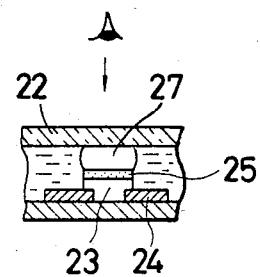
FIG. 6 is a schematic illustration showing part of the device of FIG. 5 on a somewhat enlarged scale which is useful for explaining the operation of the display device shown in FIG. 5.

It is to be noted that at least one of the substrates 21 and 22 is comprised of a material which is transparent to light. Thus, when no air bubbles are formed, such a transparent substrate exhibits the color of the opaque liquid across its entire surface. However, when current is caused to flow through selected ones of the heater elements 23 via associated pairs of electrodes 24, the heater elements become heated and air bubbles 27, as shown in FIG. 6, which is an enlargement of a portion of FIG. 5, are produced adjacent to the picture elements 25 of the heater elements thus heated. As a result, the picture elements 25 may be observed through the transparent substrate 22 and the air bubbles 27. As described before, the heater elements 23 and thus the picture elements 25 are provided on the substrate 21 in the form of a matrix and the heater elements 23 are selectively activated in accordance with an image signal, so that if the picture elements 25 are colored or produce color when heated, a two-dimensional color image may be seen through the transparent substrate 22. For example, the picture elements 25 may be comprised of a glass lining or ceramic coating such as porcelain enamel improved in resistance to heat and corrosion. The picture elements 25 may be formed to have any desired color such as red, blue, yellow, etc. and they may be different in color so as to allow to obtain a multi-color reproduced image.

It is to be noted that the size of an air bubble to be produced and the time required to produce an air bubble may be easily determined by controlling the level of current supplied to the heater element 23 and the time period to supply such current, normally in the form of a current pulse. For instance, if the time to supply current is in the order of 100 micro seconds, the air bubble shrinks rapidly after termination of supply of such current so that the picture element becomes unobservable quickly. For this reason, in the case where an image in motion is desired to be displayed in which the same frame of image does not need to be displayed for an extended period of time, there will be no problem and it is rather desired that a single frame of image disappear quickly. However, in the case where the same image is desired to be displayed for an extended period of time, it is only necessary to supply current repetitively at a predetermined frequency. On the other hand, if use is made of an operating current which is lower in level but longer in time period, air bubbles will persist for a longer period of time and thus the image remains displayed for an extended period of time even after termination of the operating current. Accordingly, in this case, repetitive application of operating current may not be required. Thus, this mode of current application is preferred in displaying a still image.

Figure 7:
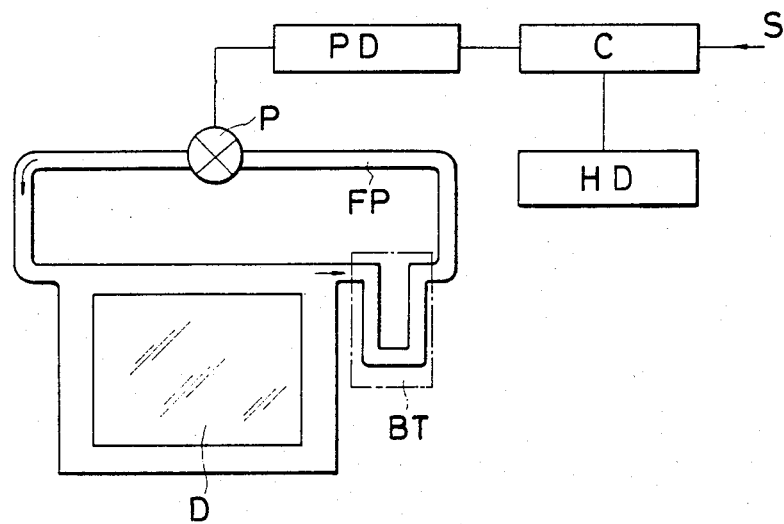
FIG. 7 is a schematic illustration showing another embodiment of the present display device.

FIG. 7 illustrates another embodiment of the present image display device. In either mode of current application described above, it takes time for the air bubble to disappear completely, and, thus, if it is desired to display different frames of image in series, it is necessary to eliminate air bubbles as quickly as possible. The bubble-controlled display device of FIG. 7 can satisfy such requirements. Described in detail with reference to FIG. 7, the display device includes a circulation pump P which causes the opaque liquid to circulate along a closed loop circulation passage FP including the display section D and an air bubble trap BT. With such a structure, since the opaque liquid is positively caused to flow by means of the pump P in the direction indicated by the arrows, the air bubbles may be carried away by the flow of liquid and trapped by the bubble trap BT. The opaque liquid free of air bubbles is again supplied to the display section D. The display device of FIG. 7 further includes a control circuit C which receives an image signal S. The control circuit C is connected to a heater driving control circuit HD and pump diving control circuit PD. Thus, the pump P is driven by the driving control circuit PD under the control of the display control circuit C. The pump P may be driven to operate intermittently or continuously with varying speed.

Figure 8:
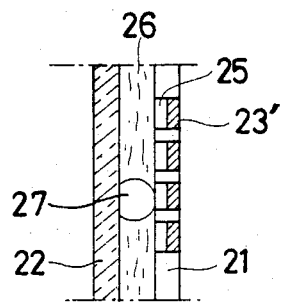
FIGS. 8 and 9 are schematic illustrations showing further embodiments of the present display device.

FIG. 8 shows an alternative structure of the display section D in which composite elements of heater element 23' and picture element 25 are provided as embedded in the substrate 21. The heater element 23' is comprised of a material which produces heat by absorbing radiation energy instead of Joule heating type heater elements 23 in FIG. 5. In the embodiment of FIG. 8, there is no need to provide electrodes as different from the Joule heating type embodiment, so that the density of picture elements 25 may be increased to enhance resolution. Furthermore, since no current is passed through the heater elements 23', the need of electrical wiring is minimized.

Figure 9:
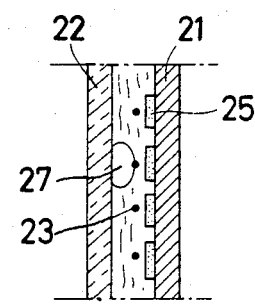

FIG. 9 illustrates a further modification of the display section D. As shown, in this embodiment, the picture elements 25 are directly provided on the substrate 21 and the heater elements 23 in the form of wire in this particular embodiment are not in direct contact with the associated picture elements 25. Such a separate arrangement between the picture elements 25 and associated heater elements 23 is a feature of this embodiment. Because, in the case where the picture elements 25 are provided in direct contact with the associated heater elements 23, the picture elements 25 are required to be sufficiently heat-resistant up to a relatively high temperature of approximately 100° C. Such requirements impose various limitations such as selection of material to be used for the picture elements 25. On the other hand, when structured as shown in FIG. 9, the picture elements 25 are prevented from being heated to an extremely high temperature locally.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical switching device comprising:
   a container for containing therein a quantity of opaque liquid, said container including a transparent light inlet section for receiving light and a transparent light outlet section;
   at least one heater element disposed in said opaque liquid; and
   control means for controlling activation of said heater element such that when said heater element is activated to increase its temperature beyond a predetermined level, a bubble is produced in said opaque liquid in alignment with said inlet and outlet section and adjacent to said heater element thereby allowing said incident light to be transmitted through said container and output through said outlet section as said output light.

2. A device of claim 1 further comprising a pair of electrodes affixed to said heater element spaced apart from each other, said pair of electrodes being fixed to said container to maintain said heater element at a desired position.

3. A device of claim 2 wherein said control means supplies current to said heater element through said pair of electrodes in order to have said heater element activated.

4. An optical switching device comprising:
   a container for containing therein a quantity of opaque liquid, said container including transparent inlet and outlet sections and a through-hole through which a void space defined between said container and said opaque liquid is in communication with the atmosphere;
   bubble producing means for producing at least one bubble when activated in said opaque liquid thereby allowing passage of light from said inlet section to said outlet section through said container; and
   control means for controlling activation of said bubble producing means.

5. A device of claim 4 wherein said bubble producing means includes a plurality of bubble producing elements arranged in the form of an array at a predetermined pitch.

6. A device of claim 4 wherein said bubble producing means includes a heater plate and a plurality of electrodes affixed to said heater plate at a predetermined pitch and also affixed to said container to hold said heater plate in position, and said control means is connected to said electrodes individually to selectively control current between any two adjacent ones of said plurality of electrodes.

7. A device of claim 4 wherein said container includes a horizontal section in which said bubble producing means is disposed and a vertical section which is in fluid communication with said horizontal section and extends vertically upwardly from one end of said horizontal section with said through-hole provided in a top wall of said vertical section.

8. A device of claim 6 wherein said container is elongated vertically in shape so as to allow to contain an increased quantity of opaque liquid therein with said bubble producing means disposed deep in said opaque liquid, whereby heat dissipation from said heater plate may be enhanced by convention when said heater plate is deactivated.

9. An optical switching device comprising:
a container for containing therein a quantity of opaque liquid, said container being formed in a closed loop and including transparent inlet and outlet sections;
bubble producing means for producing at least one bubble when activated in said opaque liquid thereby allowing passage of light from said inlet section to said outlet section through said container;
circulating means for causing said opaque liquid to circulate along said closed loop container intermittently or continuously; and
control means for controlling activation of said bubble producing means.

10. A device of claim 9 further comprising means for removing undesired foreign matter from said opaque liquid when said liquid is set in circulation.

11. A device of claim 9 wherein said bubble producing means includes a plurality of bubble producing elements arranged in the form of an array at a predetermined pitch.

12. A device of claim 9 wherein said bubble producing means includes a heater plate and a plurality of electrodes affixed to said heater plate at a predetermined pitch and also affixed to said container to hold said heater plate in position, and said control means is connected to said electrodes individually to selectively control current between any two adjacent ones of said plurality of electrodes.

13. A display device comprising:
a container for containing therein a quantity of opaque liquid, said container including a transparent section;
a plurality of picture elements disposed as normally hidden by said opaque liquid such that said plurality of picture elements are not observable through said transparent section;
a plurality of bubble producing elements provided on a one-to-one basis with respect to said plurality of picture elements, each of said bubble producing elements producing a bubble when activated in said opaque liquid thereby allowing to observe the corresponding picture element through said transparent section; and
control means for controlling activation of each of said bubble producing elements.

14. A display device of claim 13 wherein said plurality of picture elements are colored.

15. A display device of claim 13 wherein said container is formed in a closed loop and said device further comprises means for causing said opaque liquid to circulate through the closed loop.

16. A display device of claim 13 wherein each of said bubble producing elements is a heater element which produces heat, which, in turn, produces a bubble, when activated.

17. A display device of claim 16 wherein said heater element produces heat as a result of Joule heating.

18. A display device of claim 16 wherein said heater element produces heat as a result of absorption of radiation energy.

19. A display device of claim 16 wherein said heater element is in direct contact with the corresponding picture element.

20. A display device of claim 16 wherein said heater element is physically spaced apart from the corresponding picture element.

* * * * *